April 13, 1948. B. EGOR 2,439,565
CONTOUR AND DEPTH GAUGE OF DIAL INDICATOR TYPE
Filed April 20, 1946 3 Sheets-Sheet 1
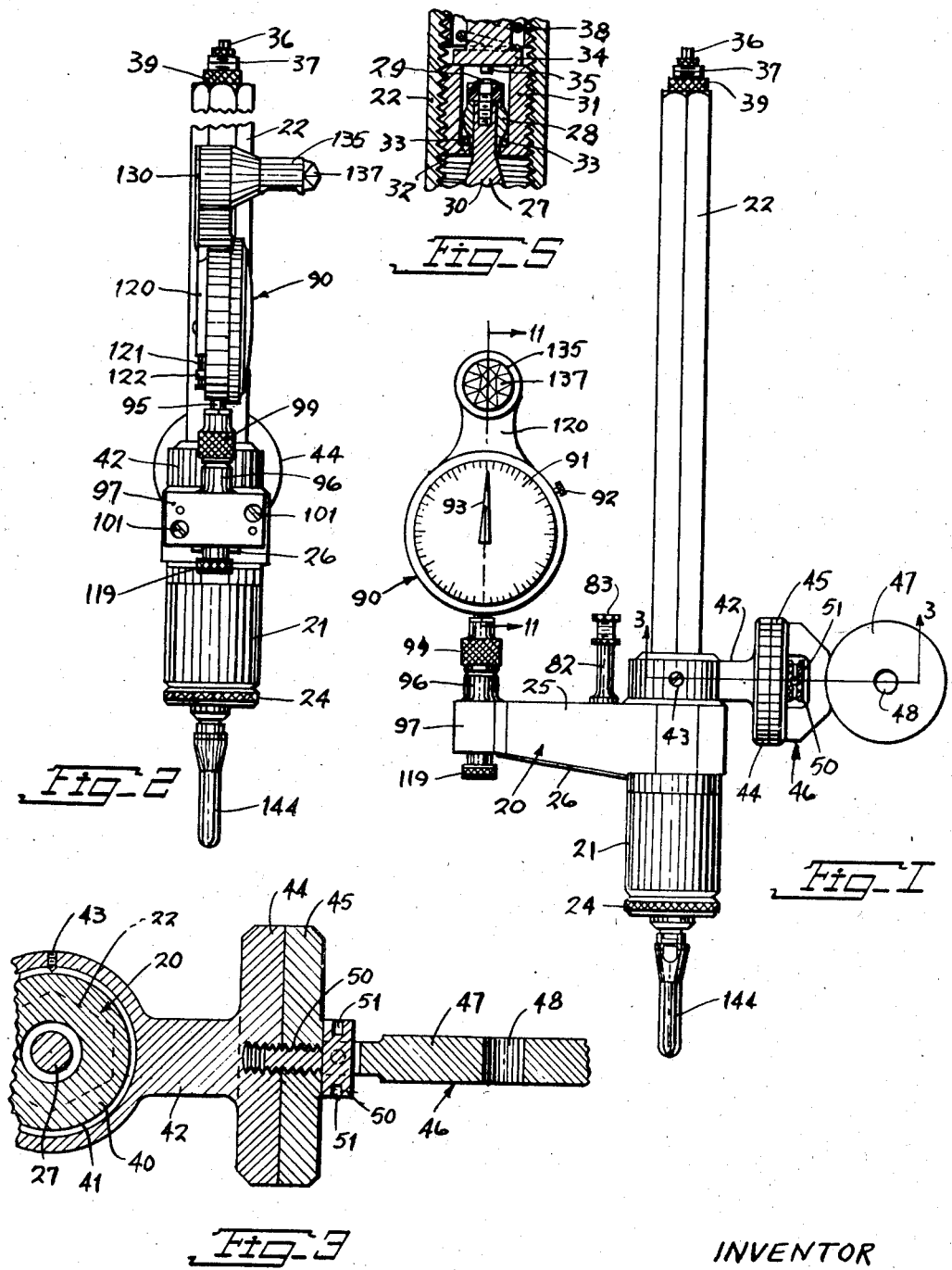
INVENTOR
BASIL EGOR
ATTORNEY.

April 13, 1948.  B. EGOR  2,439,565
CONTOUR AND DEPTH GAUGE OF DIAL INDICATOR TYPE
Filed April 20, 1946  3 Sheets-Sheet 2
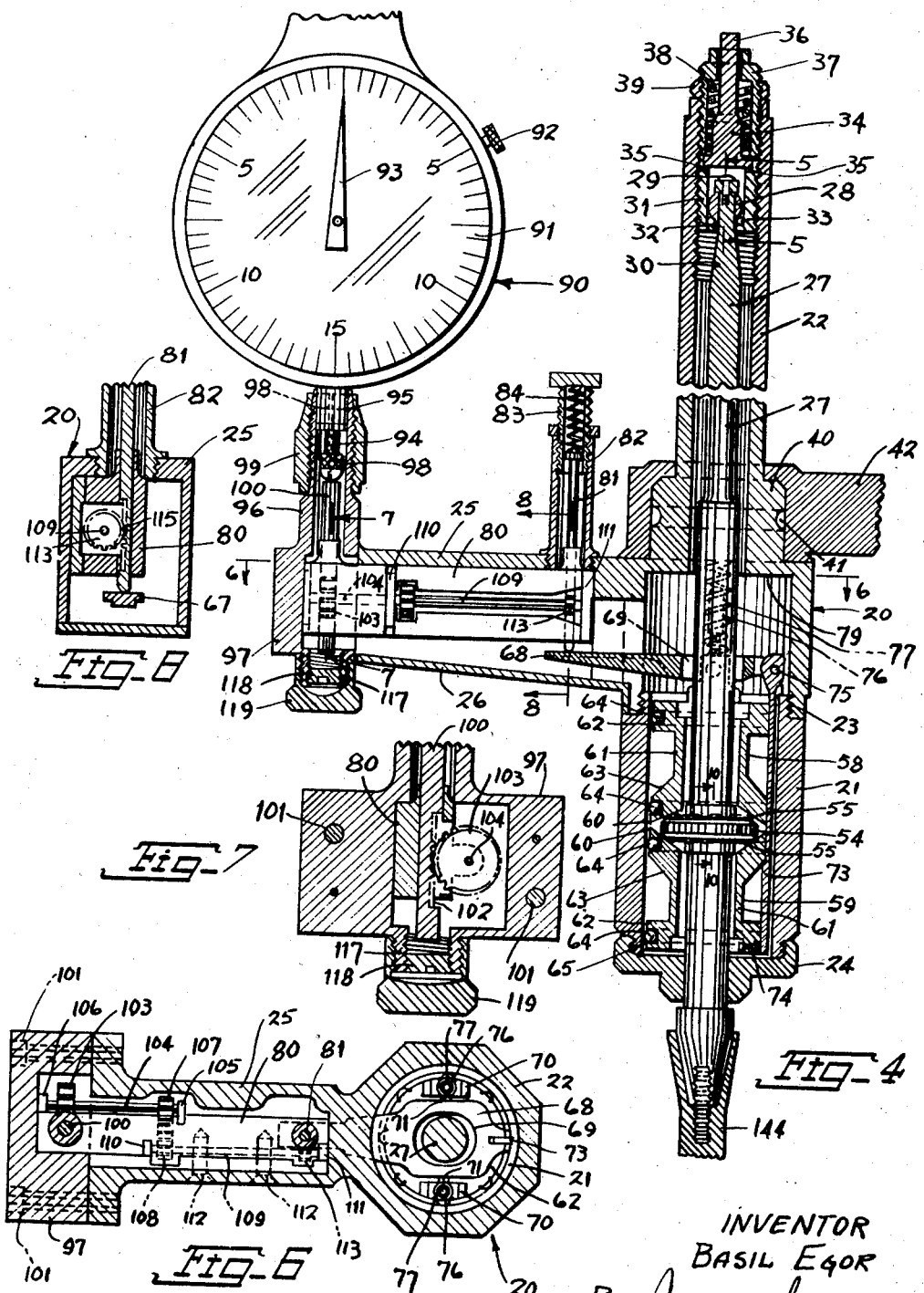
INVENTOR
BASIL EGOR
By Edward [signature]
ATTORNEY.

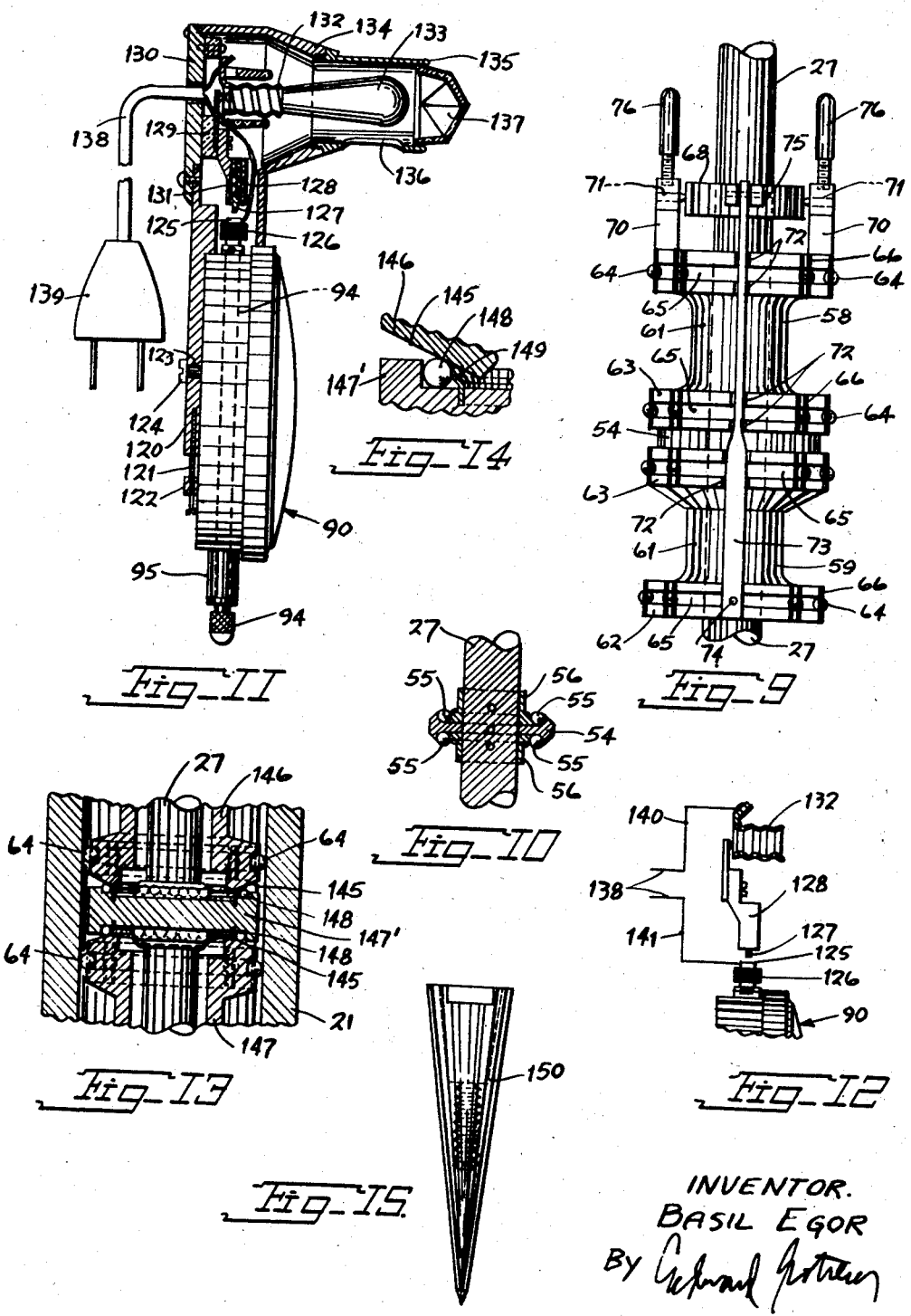

Patented Apr. 13, 1948

2,439,565

UNITED STATES PATENT OFFICE 2,439,565

CONTOUR AND DEPTH GAUGE OF DIAL INDICATOR TYPE

Basil Egor, Valley Stream, N. Y.

Application April 20, 1946, Serial No. 663,716

13 Claims. (Cl. 33—172)

This invention relates to new and useful improvements in contour and depth gauges.

More particularly, the invention proposes a contour and depth gauge which is exceptionally accurate and reliable in operation, which may be manufactured and sold at a relatively low cost and which can be used for contouring and depth gauging.

The new and improved contour and depth gauge is characterized by a disc mounted upon a rod which is swingably supported at one end and which is capable of moving a short distance upwards. It is proposed that the disc have top and bottom faces which are provided with bearing points extending annularly, coaxially thereof. It is proposed that the disc be located within a cylindrical member provided with top and bottom pistons respectively engaging above and below said disc and having frusto-conical portions engaging said bearing points. It is proposed to provide a lever pivotally mounted intermediate of its ends on and diametrically of said top piston. A flexible link connects the back end of said lever with said bottom piston. It is proposed to provide resilient means to urge the front end of said lever downwards for resiliently engaging said pistons against the bearing points on said disc. A distance indicating device is connected with said lever for indicating lateral and upward movements of said rod.

An important feature of the invention resides in the fact that the disc is located between, and acts with its bearing points against the top and bottom pistons by which very small movements are transmitted to the lever. This construction makes the contour and depth gauge very accurate. This construction is also sturdy and makes the device highly reliable. Because of the frusto-conical portions, the gauge will not be critical to vibrations and other disturbing forces.

It is another object of this invention to swingingly support the top portion of said rod in a manner so that the longitudinal position of the rod may easily be adjusted to readjust, or place the disc which is on the rod, in a proper position in relation to said top and bottom pistons. It is another object of this invention to characterize the bearing points on the top and bottom faces of the disc by series of steel balls.

A still further object of the invention resides in characterizing the top and bottom pistons with tubular central portions and top and bottom flanges. It is proposed that the top and bottom flanges be provided with steel balls engaging the cylindrical member for accurately guiding the pistons slidably within said cylindrical member.

It is proposed that the frusto-conical portions of the top and bottom pistons be concave-like, or convex-like, depending merely on design. Both of these forms have been disclosed in the specification.

Another object of this invention is to provide said lever with an opening through which the rod passes, and to provide the top piston with lugs engaged by a pivot, or pivots of said lever. It is also proposed to provide resilient means mounted upon said lugs for resiliently urging the top piston down upon the top face of said disc.

Another object of the invention is to slidably support a rod and resiliently urge this rod against the front end of said lever for constituting the resilient means for urging the front end of the lever downwards.

Another object of this invention is to connect the distance indicating device with the lever through the medium of a step up transmission. This increases the accuracy of the device.

It is also proposed to characterize the distance indicating device by the fact that it includes a graduated dial associated with a set screw by which it may be locked in various turned positions. A rotatable pointer works across this dial and is operated by suitable mechanism including a reciprocal stem.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a contour and depth gauge constructed in accordance with this invention.

Fig. 2 is a fragmentary end view of Fig. 1 looking from the left hand side.

Fig. 3 is a fragmentary enlarged horizontal sectional view taken on the line 3—3 of Fig. 1.

Fig. 4 is a fragmentary enlarged transverse sectional view through the center of Fig. 1.

Fig. 5 is a fragmentary enlarged sectional view taken on the line 5—5 of Fig. 4.

Fig. 6 is a horizontal sectional view taken on the line 6—6 of Fig. 4.

Fig. 7 is a vertical sectional view taken on the line 7—7 of Fig. 4.

Fig. 8 is a vertical sectional view on the line 8—8 of Fig. 4.

Fig. 9 is a fragmentary elevational view of certain parts shown in Fig. 4 looking from right to left.

Fig. 10 is a fragmentary enlarged sectional view taken on the line 10—10 of Fig. 4.

Fig. 11 is a fragmentary enlarged vertical sectional view taken on the line 11—11 of Fig. 1, certain of the parts not being shown in section.

Fig. 12 is a schematic wiring diagram of that portion of the device shown in Fig. 11.

Fig. 13 is a fragmentary enlarged view similar to a portion of Fig. 4 but illustrating a contour and depth gauge of modified form.

Fig. 14 is a fragmentary enlarged detailed view of a portion of Fig. 13.

Fig. 15 is an elevational view of a modified form of tracer element for the contour and depth gauge.

The contour and depth gauge, in accordance with this invention, includes a casing 20 provided with a cylindrical member 21 and a tubular member 22 coaxially of and above the cylindrical member 21. The cylindrical member 21 is a separate piece from the casing 20 and connected therewith with threaded sections 23. The bottom of the cylindrical member 21 is provided with a cap 24 which is threadedly mounted in position. The casing 20 is also provided with a laterally extending portion 25 which has an open bottom closed with a removable plate 26.

A rod 27 extends coaxially through the tubular member 22 and the cylindrical member 21. A spherical part 28 is mounted on the top portion of the rod 27. This spherical part 28 is held in position by a screw or other fastening element 29. The top end of the rod 27 is formed with a tapered portion 30 on to the top end of which the spherical part 28 is mounted. A bushing 31 is threadedly mounted internally in the top portion of the tubular member 22 and is provided with an inwardly directed bottom shoulder portion 32 which forms a seat for and beneath the spherical part 28 for indirectly supporting the rod 27 to swing horizontally in all directions, and to move upwards. A plurality of steel balls 33 are interposed between the seat 32 and the spherical part 28 for forming a bearing to properly support the rod 27 so that it may swing accurately.

The bushing 31 is associated with means by which it may be conveniently adjusted upwards and downwards for correspondingly adjusting the position of the rod 27. This means includes a key-like member 34 disposed above the bushing 31 and provided with several downwardly projecting teeth 35 engaging complementary cutout portions in the top edge of the bushing 31 by which these parts are coupled together. The key-like member 34 has an upwardly extending shank 36 which projects from the top of a bushing 37 threadedly mounted internally in the top portion of the tubular member 22. The shank 36 preferably is non-circular, as for example, triangular in cross section so as to be engageable by a complementary key by which the key-like member 34 may be turned. A spring 38 is housed within the bushing 37 and acts against the key-like member 34 for urging it downwards so that the projecting teeth 35 engage the complementary cutout portions in the top of the bushing 31. A nut 39 threadedly engages the top portion of the bushing 37 and normally engages the top end of the tubular member 22 by which the bushing 37 may be locked in adjusted positions.

The casing 20 is provided with a cylindrical portion 40 having a peripheral groove 41. A support bracket 42 engages over the cylindrical portion 40 and is provided with one or more set screws 43 by which the casing 20 may be held in turned positions on the support 42. The support 42 is also provided with a disc portion 44 disposed at right angles to the cylindrical portion 40 and engaged by a complementary disc 45 of a support bracket 46. This support bracket 46 has a lug 47 with an opening 48 by which it may be bolted upon the carriage of a machine tool. A fastening screw 50 coaxially connects the discs 44 and 45 by which they may be relatively angularly adjusted. This fastening screw 50 has a large head formed with several peripheral openings 51 for a wrench. When the screw 50 is loosened, the support 42 may be turned. The screw 50 may be tightened for locking the discs 44 and 45 in adjusted positions. It should be noted that the casing 20 may be adjusted to various turned positions along its axis and to various turned positions along the axes of the discs 44 and 45.

A disc 54 is mounted upon the rod 27 at a point within the cylindrical member 21. This disc 54 has top and bottom faces provided with bearing points 55 extending annularly coaxially thereof. The bearing points 55 are in the nature of series of steel balls 55. These steel balls 55 are held in position by bushings 56 which are fixedly mounted on the rod 27 and which engage and hold the steel balls 55 from falling out. A top piston 58 and a bottom piston 59 are slidably mounted in the cylindrical member 21, respectively above and below said disc 54. These pistons have opposed frusto-conical portions 60 engaging the bearing points 55. Each of the pistons 58 and 59 has a cylindrical central portion 61, an outer end flange 62, and an inner end flange 63. These flanges 62 and 63 are provided with series of steel balls 64 which engage the inner face of the cylindrical member 21 for accurately guiding the pistons axially of the cylindrical member 21. The steel balls 64 are set into grooves 65 formed at the peripheries of the flanges 62 and 63 and are held in position with pins 66 mounted on said flanges 62 and 63. The frusto-conical portions 60 are concave-like in the first form of the invention disclosed in Figs. 1-12, inclusive. In the modified form shown in Fig. 13 these frusto-conical portions are convex-like, as hereinafter more fully explained.

A lever 68 is pivotally mounted intermediate of its ends on and diametrically of the top piston 58. More particularly, the lever 68 has an opening 69 through which the rod 27 passes. A pair of diametrically opposite lugs 70 project from the top of the top piston 58 to the sides of the lever 68. Pivot elements 71 serve to pivotally connect the lever 68 upon the lugs 70.

A flexible link 73 connects the back end of the lever 68 with the bottom piston 59. This flexible link 73 is in the nature of a steel strip. Its bottom end is connected by a fastening element 74 with the bottom flange 63 of the bottom piston 59. The link 73 extends upwards, preferably through slots 72 in the flanges 62 and 63 of the pistons 58 and 59. A pin bearing or other good bearing 75 pivotally connects the back end of the lever 68 with the top of the flexible link 73.

A stud 76 is mounted on each lug 70. An expansion spring 77 is coaxially mounted on each stud 76 and acts against a top wall or shoulder 79 formed in the casing 20 by which the top piston 58 is resiliently maintained against the disc 54. The front end of the lever 68 is associated with resilient means for urging it downwards for resilently engaging the pistons 58 and 59 against the bearing points 55 of the disc 54. This resilient means includes a block 80 mounted within the casing 20. A rod 81 is slidably mounted through the block 80 and has its bottom end engaging the top face of the front end of the lever 68. This rod 81 extends into a tubular member 82 mounted on the casing 20. A bushing 83 is adjustably mounted on the tubular member 82 and houses an expansion spring 84 which engages the rod 81 by which the rod 81 is resiliently urged downwards. The bushing 83 may be adjusted to move upwards or downwards for controlling the compression of the spring 84.

A distance indicating device 90 is indirectly connected with the lever 68 for indicating lateral and upward movements of the rod 27. This distance indicating device 90 includes a graduated dial 91 which is free to turn and which may be locked in various turned positions by a set screw 92. A rotatable pointer 93 operates over the dial 91. This pointer 93 is operated by suitable mechanism not disclosed in detail on the drawing as it forms no part of this invention, and distance indicating devices of this general construction are well known in the art. However, the device 90 has the usual reciprocal stem 94 by which it is operated. The reciprocal stem 94 projects from a tube 95 at the bottom of the device 90. The tube 95 is engaged into a tubular portion 96 on the top of an end block 97 mounted upon the end of the casing 20. The tubular portion 96 has several slots 98 extended inwards from its top end. A clamping bushing 99 is threadedly mounted on the tubular portion 96 and has a tapered top portion engaging a complementary tapered top portion of the tubular portion 96 by which the tube 95 may be gripped and held for properly supporting the distance indicating device 90.

A step up transmission is utilized to connect the reciprocal stem 94 with the lever 68. This step up transmission includes a rod 100 slidably mounted through the block 80 which extends into the hollow of the end block 97. The end block 97 is mounted in position on the casing 20 with fastening elements 101. The rod 100 is provided with a rack section 102 which engages a pinion 103 upon a shaft 104 rotatively mounted on the block 80 with suitable bearings 105 and 106. The shaft 104 is provided with another pinion 107 which engages a pinion 108 upon a shaft 109 which is also rotatively mounted upon the block 80 with bearings 110 and 111. The block 80 is held within the casing 20 by fastening screws 112. The shaft 109 is provided with a pinion 113 which engages a rack section 115 formed on the rod 81.

The step up transmission is such, that with the particular design of the gears illustrated on the drawing, the rod 100 will move upwards about five times the distance that the rod 81 moves upwards and will move downwards about five times the distance that the rod 81 moves downwards. Thus we have a mechanical advantage of approximately 5:1. The bottom of the block 97 is provided with a tubular portion 117 which supports an adjustable stop screw 118 which is located beneath the bottom of the rod 100 and limits its downward motion. A cap 119 is mounted on the bottom of the tubular portion 117.

A support 120 is adjustably mounted on said distance indicating device 90 longitudinally of its stem 94. More specifically, the support 120 is disposed against the back of the device 90 and may be moved by an adjustment screw 121 which rotatively engages through a lug 122 on the back of the device 90. The support 120 is provided with a slot 123 through which a clamp screw 124 passes and threadedly engages the device 90. The clamp screw 124 may be loosened and then the adjustment screw 121 may be turned for moving the support 120 downwards. The support 120 is manually moved upwards. When the support is in a desired position it is locked by the clamp screw 124.

A contact 125 is mounted on the stem 94 and insulated from the stem 94 by an insulation member 126. A depressible pin 127 is connected with the support 120 and is positioned in line with the contact 125 and slightly spaced from said contact 125 when the stem 94 is in its retracted position, that is its "down" position. The depressible pin 127 is slidably mounted in a casing 128 which is mounted on a porcelain bracket 129. This bracket 129 is mounted on a back cover 130 removably mounted on the support 120. An expansion spring 131 is disposed within the casing 128 and resiliently urges the pin 127 downwards. The porcelain bracket 129 also forms a base for an electric light socket 132 which is provided with an electric lamp 133. The support 120 has a tubular portion 134 on which a tube 135 is supported. This tube 135 has a bottom opening 136 through which light from the lamp 133 may illuminate the distance indicating device 90. The front of the tube 135 is provided with a red translucent button 137.

An electric cable 138 is provided with a plug 139 by which it may be connected with the socket of an electric system. The cable 138 has a lead 140 which connects with the shell terminal of the electric lamp socket 132. The cable 138 has another lead 141 which connects with the contact 125.

A tracing terminal 144 is removably mounted on the bottom of the rod 27.

The operation of the device may be understood from the following:

The contour and depth gauge is intended to be used in conjunction with machine tools such as lathes, millers, shapers, and the like. It is proposed that it be supported on the carriage of the machine tool by utilizing the support lug 47 and engaging a holding bolt through the opening 48. The contour and depth gauge may be turned to a convenient position by loosening the holding screws 43 and 50. It is then tightened in the selected position. The form (not shown on the drawing) which is to be followed is mounted in a stationary position on the machine tool so as to be engaged by the tracer terminal 144 when the carriage of the machine tool reaches a preselected position. When the terminal 144 strikes the form it will be moved. When contouring is done the terminal 144 will be moved laterally in any direction, depending on the mounting of the contour and depth gauge.

The slightest movement of the terminal 144 laterally will swing the rod 27 which will indirectly cause the top piston 58 to move slightly upwards and the bottom piston 59 to move slightly downwards. The reason for this resides in the fact that the bearing points 55 are normally in intimate contact with the frusto-conical portions 60 and even the slightest movement of the rod 27 will naturally force the pistons 58 and 59 apart. As the pistons 58 and 59 move upwards and downwards, respectively, a resultant movement will be communicated to the lever 68 so that its front end moves upwards. This lifts the rod 81 and through the step-up transmission, the rod 100 will move upwards in a step-up ratio. The rod 100 moves the operator stem 94 of the distance indicating device 90 so that the rotatable pointer 93 operates across the dial 91. The pointer 93 may be allowed to move a certain predetermined distance, for example, a distance indicating a .0010 inch at the form, and then the carriage of the machine tool should be halted.

The support 120 may also be adjusted so that there is a predetermined distance between the contact 125 and the pin 127. After the operator stem 94 has moved this distance, the contact 125 will electrically connect with the pin 127, closing the electric circuit through the lamp 133 which will then become illuminated. Further motion of the operator stem 94 merely moves the pin 127 upwards.

When the contour and depth gauge is used to indicate depth, the terminal 144 will be moved upwards. Because the bearing points 55 are engaging the top frusto-conical portion 60, the top piston 58 will be correspondingly moved upwards. Since the front end of the lever 68 cannot move downwards because the back end is connected with the link 73 which is connected with the bottom piston 59, which in turn has its frusto-conical portion 60 engaging the bottom bearing points 55 of the disc 54, the bottom piston 59, the link 73 and the lever 68 must move upwards and correspondingly move the rod 81 when the disc 54 moves the top piston 58 upwards during upward motion of the terminal 144. Motion of the rod 81 will be transmitted to the distance indicating device 90, as before explained.

From the above it will be clear that the contour and depth gauge may be used both for contouring and for depth.

In Figs. 13 and 14 a modified form of the invention has been disclosed which distinguishes from the prior form in the fact that the frusto-conical surfaces 145 of the top and bottom pistons 146 and 147, respectively, are convex-like. In this form of the invention the rod 27 is provided with a disc 147' which has bearing points 148 extending annularly coaxially thereof. These bearing points 148 are in the nature of steel balls 148. They are held in position with holding rings 149 mounted on the top and bottom faces of the disc 147'. The bearing points 148 engage the frusto-conical portions 145.

In other respects this form of the invention is identical to the previous form and like parts are indicated by like reference numerals.

The operation of this form of the invention is substantially identical to the prior form. When the rod 27 swings laterally the bearing points 148 acting against the frusto-conical portions 145 will force the top piston 146 upwards and the bottom piston 147 downwards. When the rod 27 moves upwards, during depth gauging, the bearing points 148 will move the top piston 146 upwards. In other respects the operation is identical to the prior form of the invention.

In Fig. 15 a pointed type of tracer terminal 150 is illustrated which is intended to be substituted for the tracer terminal 144 for certain types of work. It should be noted that the tracer terminal 144 has a rounded bottom which is suited for contouring. The tracer terminal 150 has a pointed bottom which is suitable for more accurate tracing as for example tracing center lines and for depth work.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod.

2. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movement of said rod, said seat comprising a bushing adjustably mounted on said tubular member and having a bottom shoulder portion and engaging said spherical part.

3. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicatng lateral and upward movements of said rods, said seat comprising a bushing adjustably mounted on said tubular member and having a bottom shoulder portion, steel balls engaging about said shoulder portion and engaging said spherical part, and means for adjusting said bushing including a key turnably mounted and projecting from the top of said tubular member and engaging said bushing.

4. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said seat comprising a bushing adjustably mounted on said tubular member and having a bottom shoulder portion, steel balls engaging about said shoulder portion and engaging said spherical part, means for adjusting said bushing including a key turnably mounted and projecting from the top of said tubular member and engaging said bushing, and resilient means urging said key into engagement with said bushing.

5. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movement of said rod, said bearing points on the top and bottom faces of said disc comprising a series of steel balls.

6. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, each of said pistons including a tubular central portion through which said rod passes and top and bottom flanges, and steel balls mounted on and projecting from said flanges and engaging the wall of said cylindrical member.

7. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movement of said rod, said frusto-conical portions being concave-like.

8. A contour and depth gauge, comprising a casing provided with a cylindrical member and a tubular member coaxially of and above said cylindrical member, a vertical rod extending coaxially through said member, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points of said disc, and a distance indicating device connecting with said lever for indicating lateral and upward movements of said rod, said lever being provided with an opening through which said rod passes, and lugs projecting from said top piston and engaged by a trunnion mounted on said lever by which said lever is pivotally mounted as stated.

9. A contour and depth gauge, comprising a casing provided with a cylindrical member and a tubular member coaxially of and above said cylindrical member, a vertical rod extending coaxially through said member, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said lever being provided with an opening through which said rod passes, and lugs projecting from said top piston and engaged by a trunnion mounted on said lever by which said lever is pivotally mounted as stated, and springs acting against said lugs for urging said top piston downwards against said disc.

10. A contour and depth gauge, comprising a casing provided with a cylindrical member and a tubular member coaxially of and above said cylindrical member, a vertical rod extending coaxially through said member, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said resilient means for urging the front end of said lever downwards including a block mounted in said casing, a rod slidably mounted in said block and having its bottom end engaging said lever, and a second resilient means urging said rod downwards.

11. A contour and depth gauge, comprising a casing provided with a cylindrical member and a tubular member coaxially of and above said cylindrical member, a vertical rod extending coaxially through said member, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said resilient means for urging the front end of said lever downwards including a block mounted in said casing, a rod slidably mounted in said block and having its bottom end engaging said lever, and a second resilient means urging said rod downwards, said second resilient means including a spring, and means for adjusting the pressure of said spring.

12. A contour and depth gauge, comprising a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said distance indicating device being connected with said lever through the intermediary of a step up transmission.

13. A contour and depth gauge, comprising a a casing provided with a cylindrical member and a tubular member coaxially of and above said cylindrical member, a vertical rod extending coaxially through said members, a spherical part mounted on the top portion of said rod, a seat for and beneath said spherical part for supporting said rod in order that said rod may oscillate as well as move longitudinally of its own axis, a disc mounted at right angles on said rod at a point within said cylindrical member and having opposed and parallel top and bottom faces provided with bearing points extending annularly coaxially of said rod, a top piston and a bottom piston slidably mounted in said cylindrical member with respect to the top and to the bottom of said disc and having frusto-conical portions engaging said bearing points and furthermore having openings through which said rod passes, a horizontal lever pivotally mounted intermediate of its ends on and diametrically of said top piston, a flexible link connecting the back end of said lever with said bottom piston, resilient means urging the front end of said lever downwards for resiliently engaging said pistons against the bearing points on said disc, and a distance indicating device connecting with said lever for indicating lateral and upward movements of said rod, said distance indicating device being connected with said lever through the intermediary of a step up transmission, said step up transmission including racks and gears.

BASIL EGOR.

REFERENCES CITED

The following references are of record in the file of this patent:

UNITED STATES PATENTS

| Number | Name | Date |
| --- | --- | --- |
| 1,290,434 | Walter | Jan. 7, 1919 |
| 2,324,998 | Dague | July 20, 1943 |
| 2,410,094 | Martinec | Oct. 29, 1946 |

FOREIGN PATENTS

| Number | Country | Date |
| --- | --- | --- |
| 218,397 | Switzerland | 1942 |